United States Patent Office 3,461,102
Patented Aug. 12, 1969

3,461,102
FIBERS FROM ELASTOMERIC POLYURETHANES CONTAINING TERTIARY AMINO GROUPS
Harald Oertel and Heinrich Rinke, Leverkusen, Fritz Moosmuller, Dormagen, and Friedrich-Karl Rosendahl, Leverkusen-Schlebusch, Germany, assignors to Farbenfabriken Bayer Aktiengesellschaft, Leverkusen, Germany, a corporation of Germany
No Drawing. Filed Aug. 17, 1965, Ser. No. 480,493
Claims priority, application Germany, Aug. 19, 1964, F 43,788
Int. Cl. C08g 22/16, 22/04
U.S. Cl. 260—75                10 Claims

ABSTRACT OF THE DISCLOSURE

Synthetic elastic filaments having improved dyeability with anionic dyestuffs are prepared by reacting a polyhydroxy compound, an excess of an organic diisocyanate and a chain extending agent selected from diamines, hydrazine, dihydrazides and mixtures thereof, the reaction being conducted in the presence of dihydric alcohol containing tertiary amino groups and spinning a solution thereof into filaments.

---

This invention relates to polyurethane elastomers, filaments thereof and to a process for the production of the polyurethane elastomers in solution.

The production of polyurethane elastomers by the diisocyanate polyaddition process from high molecular, substantially liear polyhydroxyl compounds, polyisocyanates and organic chain-lengthening agents containing reactive hydrogen atoms by reaction in highly polar organic solvents is already known. In particular, these polyurethane elastomers produced in highly polar organic solvents are also formed into threads and fibres which are used for numerous textile purposes, especially in the corsetry and underwear industry for bathing wear, elastic garments or stockings, in some cases as threads or fibres round which other threads or staple fibre yarns are spun (core spun elastomer yarns) and as staple fibre admixture to non-elastic fibres for the purpose of improving the wearing properties of fabrics that are not in themselves highly elastic.

Elastic polyurethane threads have numerous advantages over rubber threads. In particular, in contrast to rubber threads, they can be dyed relatively easily with certain classes of dyestuffs such as dispersion dyestuffs. Owing to the special structure of polyurethane elastomer threads, which consist of at least about 70% of amorphous components (polyhydroxyl components), these elastomer threads take up certain dyestuffs (e.g. dispersion dyestuffs) relatively easily but on the other hand the dyestuffs can very easily diffuse out again from the elastomer substance, for example on washing, so that such dyes are usually of low (wet) fastness. The same applies to dyeings with so-called acid dyestuffs, chrome dyestuffs or afterchroming dyestuffs which are produce dyeing of insufficient fastness, frequently accompanied by inadequate absorption rates and depths of color; this also impairs the fastness of the dyes to abrasion.

However, if polyurethane elastomer fibres are to be widely used for textile purposes, deep and fast dyeing of these fibres is essential. This applies especially to the use of important groups of dyestuffs such as acid dyestuffs, metal complex dyestuffs and chrome dyestuffs, with which polyamides, for example, which are used preferentially with elastic polyurethane threads, can be dyed in fast and deep color tones. An object of this invention is to provide new synthetic elastic filaments having improved properties. In general, the filaments of the present invention have an essentially linear structure, comprising a segmented polyurethane from a NCO-prepolymer and a chain-extending agent consisting of a diamine, hydrazine and/or a dihydrazide, said segmented polyurethane containing units of the formula:

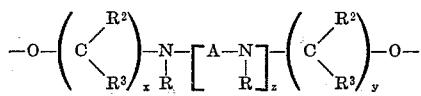

or

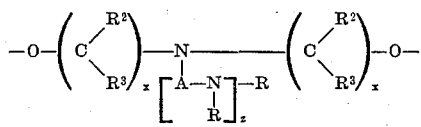

wherein A is an alkylene chain, R an aliphatic, cycloaliphatic or araliphatic radical, $R^2$ hydrogen, alkyl, cycloalkyl, aralkyl or aryl, $R^3$ hydrogen or alkyl, $x$ and $y$ an integer from 1 to 6 and $z$ a whole number from 0 to 2.

These units are connected by —CO.NH-groups, forming urethane linkages in the segmented polyurethane.

It is a further object of this invention to improve the dyeability of polyurethane elastomers used for producing highly elastic threads or foils, especially with anionic dyestuffs from the series of acid dyestuffs, metal complex dyestuffs or after-chroming dyestuffs, which preferably contain acid groups (e.g. sulphonic acid groups or their salts) in the dyestuff. We have found that dyeability of polyurethane elastomers can be very greatly increased if dihydric alcohols which contain at least one tertiary nitrogen atom and in which the carbon atoms adjacent to the nitrogen atoms are aliphatic carbon atoms are added during the process of preparing solutions of substantially linear polyurethane elastomers in polar organic solvents by reacting high molecular weight, substantially linear polyhydroxyl compounds with an excess of diisocyanates and with hydrazine and/or bifunctional compounds having $NH_2$ and/or —X—CO—NH—$NH_2$ end groups (X=—O—, —NH—, —N—alkyl—) as chain-lengthening agents. The dihydric alcohols are added in quantities such that 20 to 400 mval. of tertiary nitrogen is present per kg. of elastomer substance in the finished solvent-free elastomer.

The modification of the molecular structure achieved by incorporating diols which contain tertiary nitrogen atoms not only has a positive effect on the dyeability but also has the effect of improving various mechanical and elastic properties such as tensile strength and elastic modulus without at the same time impairing the elasticity of the products or their permanent elongation. In addition, shaped articles such as threads or foils made from the modified elastomer substances also manifest increased resistance to yellowing on prolonged standing in air or on exposure to combustion gases or waste gases and on exposure to light, especially to sources to UV radiation. Much lighter colored threads and foils are also obtained from these elastomer solutions on spinning by the dry spinning process or casting. This applies especially to the relatively easily discolored polyurethane materials which are obtained by chain-lengthening of NCO preadducts with aromatic diamines.

The incorporation of the tertiary amine groups has, surprisingly, practically no influence on the resistance of the elastomers to hydrolysis.

On dyeing, the modified polyurethane elastomers do not manifest any loss of additives by migration such as may be observed and found to be a serious disadvantage in the case of low molecular weight or even high molecular weight additives having tertiary amino groups.

By suitable choice of the proportions of dihydric alcohols containing tertiary nitrogen atoms within the polyurethane material, elastomer threads can be obtained which can easily be dyed by a tone-in-tone dyeing with the yarns spun round the elastomer core or with other components of the fabric, with the result that such threads can have a wide field of application in textiles.

It was surprising to find that in the reaction of the polyhydroxyl compounds with the diisocyanates to form NCO preadducts, which generally react very sensitively to additional branching reactions, substantially linear NCO preadducts can be obtained in this case in spite of the presence of tertiary aliphatic amino groups which are known to have a strongly catalytic effect on chain growth and chain branching, and these substantially linear NCO preadducts react in the subsequent chain-lengthening reaction with diamines, hydrazine and/or dihydrazides to form uncross-linked, homogeneous elastomer solutions.

The tertiary amino groups of the dihydric alcohols which are to be used for the modification should preferably carry aliphatic, cycloaliphatic or araliphatic substituents on the nitrogen atom since it has been found that tertiary amino groups in which only one of the substituents is aromatic have no effect or only an insufficient effect in increasing the dyeability.

The alkyl groups on the nitrogen atom are preferably lower alkyl groups (e.g. methyl to butyl groups) and may have straight chains or branched carbon chains. The molecular weight of the compounds should preferably be below 750, preferably between 119 and 300. The hydroxyl groups of the dialcohols should be bound to aliphatic carbon atoms. Phenolic hydroxyl groups are less suitable for incorporation.

Examples of dihydric alcohols with tertiary nitrogen atoms which can be used according to the invention, in which all the carbon atoms directly adjacent to the nitrogen atom are aliphatic carbon atoms are given below. gen atom and aliphatic carbon atoms are given below. These compounds can be represented by the general formula:

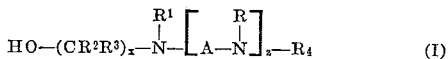

A = an alkylene chain which may be branched,
R = an aliphatic, cycloaliphatic or araliphatic radical, or in which two R groups may be joined to an alkylene chain with ring closure when $z \geq 1$
$R^1$ = R, —$(CR^2R^3)_x$—OH
$R^2$ = H, alkyl, cycloalkyl, aralkyl,
$R^3$ = H, alkyl
$R^4$ = R, —$(CR^2R^3)_y$—OH
$x \geq 1$, preferably 2–6
$y \geq 1$, preferably 2–6
$z \geq 0$, preferably 0–2.

In Formula I, a total of only two —$(CR^2R^3)_y$—OH or —$(CR^2R^3)_x$—OH radicals are allowed to be present. The dihydric alcohols with tertiary nitrogen atoms preferably have the formula

wherein:
A = an alkylene chain with 2—12 C-atoms
R = an alkyl radical, cycloalkyl radical, aralkyl radical, or in which two R groups may be joined to an alkylene chain with 2–4 C-atoms with ring closure if $z \geq 1$
$R^1$ = H, alkyl, cycloalkyl, aralkyl with inert substituents,
$R^2$ = H, alkyl
$x \geq 1$, preferably 2–6
$y \geq 1$, preferably 2–6
$z \geq 0$, preferably 0–2.

The following compounds are specific examples: Bis-(2-hydroxyethyl)-methylamine, bis - (2 - hydroxyethyl)-isopropylamine, bis-(2-hydroxyethyl)-butylamine, bis-(2-hydroxyethyl)-cyclohexylamine, bis-(2-hydroxypropyl-1)-methylamine, bis-(2-hydroxypropyl-1)-ethylamine, bis-(2-hydroxypropyl - 1) - cyclopentylamine, bis-(2-hydroxyethyl)-benzylamine, bis-(2-hydroxyethyl) - propylamine, bis-(3-hydroxypropyl)-methylamine, bis - (4 - hydroxybutyl)-methylamine and bis - (2-hydroxyethyl-2-phenyl)-methylamine.

Diols which contain two or more tertiary nitrogen atoms in the molecule are especially suitable because the quantity of diols required for modifying the dyeability is thus greatly reduced.

Favorable results can be obtained with, for example, the following compounds:

N:N'-dimethyl-N:N'-bis-(β-hydroxyethyl)-ethylenediamine,
N:N'-dimethyl-N:N'-bis-(β-hydroxyethyl)-propylenediamine-1:2,
N:N'-bis-(β-hydroxyethyl)-piperazine,
N:N'-dimethyl-N:N'-bis-(β-hydroxypropyl)-ethylenediamine-1:2,
N:N'-bis-(β-hydroxypropyl)-piperazine,
N:N'-diethyl-N:N'-bis-(β-hydroxyethyl)-hexamethylene-diamine-1:6,
N:N'-bis-(β-hydroxyethyl)-trans-2:5-dimethylpiperazine,
N:N'-dimethyl-N:N'-bis-(β-hydroxypropyl)-propylene-diamine-1:3,
N:N'-diisopropyl-N:N'-bis-(β-hydroxypropyl)-ethylene-diamine.

The following compounds may also be mentioned as examples:

N:N'-bis-(ε-hydroxy-γ - oxa - pentyl) - piperazine, N-methylimino - (N':N" - dimethyl - N':N"-di-β-hydroxypropyl)-dipropylamine, N:N'-dimethyl - N:N' - bis - (β-hydroxyethyl)-benzylamine and the compound of the formula,

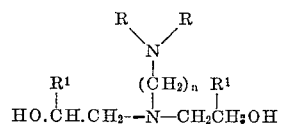

wherein R has the meaning given above, $R^1$ is hydrogen or methyl and $n$ is preferably a whole number between 2 and 12. Moreover, for example, the chain length between the hydroxyl groups may be varied and the $CH_2$ groups may be replaced by CHR—(R=low alkyl) or —CRR—groups, i.e. N,N-dimethyl-N',N'-bis-(β-hydroxypropyl)-propylene-diamine-1,3; N,N-dimethyl-N',N' - bis-(β-hydroxyethyl)-propylene-diamine-1,3.

One or more —$CH_2$— or —CR'R"— chain members may if desired be substituted by —O—. Substitution by —S— is generally not desirable since it has been found that in many cases this greatly increases the discoloration in light.

The polyurethane elastomers can be built up by known methods, for example by reacting bis-chloroformic acid esters of high molecular polyhydroxyl compounds or dihydric alcohols containing tertiary nitrogen groups with diamines, hydrazine and if desired further reactive components such as bis-chloroformic acid esters of glycols or bis-acid chlorides. In general, technical synthesis is preferably carried out by the diisocyanate polyaddition process although the polyurethanes obtained by the polycondensation process via polychloroformic acid esters have practically the same properties for substantially the same structure as the elastomers obtainable by the diisocyanate polyaddition process.

For building up the polyurethane elastomers by the diisocyanate polyaddition process, it is suitable to use mainly linear polyhydroxyl compounds having mainly terminal hydroxyl groups and a molecular weight of about 500 to 5000 and melting points preferably below about 60° C., e.g. polyesters of polycarboxylic acids and polyhydric alcohols, polyester amides, polyethers, polyacetals, poly-N-alkyl urethanes or mixtures thereof as well as suitable copolymers having, for example, ester-, ether-, acetal-, amide-, urethane- or N-alkylurethane groups side by side, the melting points of the high molecular weight polyhydroxyl compounds being preferably below 45° C. to ensure good elastic and low temperature properties. The polyhydroxyl compounds may also be modified with less than equivalent quantities of diisocyanates with single or multiple pre-lengthening. The preferred molecular weight is between about 800 and 3000. Suitable high molecular weight polyhydroxyl compounds are mentioned for example in the British Patent 917,450 and Belg. Patent 636,976.

Especially to be mentioned are polyesters of adipic acid, azelaic acid and sebacic acid and, if desired, mixtures of dialcohols having preferably 5 or more carbon atoms, e.g. 2:2-dimethylpropanediol-1:3, and 1:6-hexanediol, since such polyesters have relative good resistance to hydrolysis; also to be mentioned are polyethers, preferably polytetramethylene ether diols, which may if desired be used as mixed polyethers, for example by incorporating a smaller quantity of propylene oxide or ethylene oxide by polymerisation. Advantageous properties, especially fastness to light, are obtained with polyether derivatives in which the hydroxyl end groups have been replaced by an —OCON(Alkyl).CH$_2$(CH$_2$)$_x$.OH($x \geq 1$) group.

For the reaction with the high molecular weight polyhydroxyl compounds, diisocyanates such as those mentioned in the aforesaid patent specifications are used. Diphenylmethane-4:4'-diisocyanate, isomeric toluylene diisocyanates and in particular portions of aliphatic diisocyanates such as hexane-1:6-diisocyanate or cyclohexane-1:6-diisocyanate have been found to be especially suitable.

As organic chain-lengthening agents which have NH$_2$ and/or XCONH.NH$_2$ (X=—O—, —NH—, —N-alkyl—)- end groups and which produce the high molecular urethane elastomers by reaction with the NCO preadducts, it is preferred to use difunctional, relatively low molecular compounds (molecular weight preferably below 400, more particularly below 275), for example diamines, hydrazines or "dihydrazide" compounds such as dicarboxylic acid dihydrazides, bis-carbazinic acid esters or bis-semicarbazides.

The following are examples of chain-lengthening agents which may if desired be in admixture: Ethylene diamine, 1:2-propylene diamine, 1:3-propylene diamine, 1:6-hexamethylenediamine, 1:3- and 1:4-cyclohexanediamine, hexahydro - meta - xylylenediamine, m - xylylenediamine, p - xylylenediamine, hydroquinone - bis-(ω-aminopropyl)-ether, piperazine, 2:5-dimethylpiperazine, N:N'-dimethyl-N:N' - bis-(γ-aminopropyl)-ethylenediamine, piperazine-N:N' - bis - (γ-propylamine), 4:4'-diamino-diphenylmethane, 4:4' - diamino-diphenyl-dimethylmethane, 1:2-bis-aminohydroxyethane, ω-aminoacetic acid hydrazide, ω-aminobutyric acid hydrazide, ω-aminocaproic acid hydrazide, piperazine-N:N'-diacetic acid dihydrazide, piperazine-N:N'-dipropionic acid dihydrazide, ethylene diamine-N:N'-dimethyl-N:N'-dipropionic acid dihydrazide, carbodihydrazide, hydracrylic acid dihydrazide, adipic acid dihydrazide, isophthalic acid dihydrazide, m-xylylenedicarboxylic acid dihydrazide, ethyleneglycol-bis-carbazinic ester, butanediol-bis-carbazinic ester, ethylene-bis-semicarbazide, hexamethylene-bis-semicarbazide, 1:1-dimethyl-4-(γ-propylamino-)-semicarbazide, and hydrazine or hydrazine hydrate or N:N'-diaminopiperazine. Aliphatic or araliphatic diamines such as ethylene diamine, m-xylylene diamine and hydrazine or carbodihydrazide are preferred as chain-lengthening agents. Compounds having more than two reactive hydrogen atoms may if desired be included but only in very small quantities (at the most up to about 3 mols. percent of chain-lenegthening agent), e.g. trimethylolpropane, tartaric acid, citric acid trihydrazide or aliphatic triamines.

The chain-lengthening agents which carry —NH$_2$ end groups generally react very rapidly and tend to produce cross-linking reactions with isocyanate groups of the preadducts and it is therefore preferable not to work with free hydrazine or diamines but with carbazinic acids or aminocarbonates produced by the addition of $CO_2$. Alternately, a multi-step process is employed in which an excess of chain-lengthening agents is first employed and only then the desired degree of polymerisation or the desired viscosity of the solution is adjusted in order to circumvent the difficulties arising from the high reactivity of the chain-lengthening agents (Belg. Patent 636,976).

First the high molecular, substantially linear polyhydroxyl compound is reacted in solution or in the absence of solvent with an excess of diisocyanates. According to one method of carrying out the process of the invention, the dihydric alcohols having tertiary nitrogen atoms together with the higher molecular, substantially linear polyhydroxyl compounds may be reacted with an excess of diisocyanates and then further reacted with chain-lengthen-agents in polar solvents. The ratio of OH to NCO is then generally 1:1.3 to 1:3.0, the process being carried out in the melt or in inert solvents such as dioxane, benzene, chlorobenzene at temperatures of about 40 to 120°, preferably 70 to 100° C., and the reaction times observed (about 15–150 minutes) being such that a substantially linear preadduct with free NCO groups is obtained which, in the chain-lengthening reaction with approximately equivalent quantities of chain-lengthening agents having NH$_2$ and/or XCONH.NH$_2$— end groups, results in a substantially linear product of sufficiently high molecular weight (above 10,000) which is still soluble in solvents such as dimethylformamide or dimethylsulphoxide. The viscosities of the elastomer solutions having a solids content of about 15 to 30% should be in the region of 10 to 1500 poises/20° C.

Instead of using the dihydric alcohol containing nitrogen atoms together with the higher molecular polyhydroxyl compound, the dihydric alcohol may be mixed into the reaction mixture of higher molecular polyhydroxyl compound and diisocyanate in the course of or at the end of the formation of preadduct.

According to a further method of carrying out the process of the invention, reaction products, containing terminal hydroxyl groups, of the dihydric alcohols which have tertiary nitrogen atoms may be reacted with less than equivalent quantities of diisocyanates together with higher molecular, substantially linear polyhydroxyl compounds with an excess of diisocyanates, followed by reaction with the chain-lengthening agent in polar solvents. If the dihydric alcohols containing tertiary nitrogen atoms are reacted with subequivalent quantities of diisocyanates in a molar ratio of about 2:1 to 1.1:1, dialcohols having tertiary nitrogen atoms and linked through urethane groups are obtained. Since in this case other diisocyanates may be used than those for the formation of preadduct with higher molecular polyhydroxyl compounds, it is in this way possible to incorporate specific polyurethane segments. Thus, for example, by reacting 3 mols. of N:N'-dihydroxyethylpiperazine with 2 mols. of hexane-1:6-diisocyanate, a diol having 6 tertiary atoms may be obtained which is very fast to light. This diol or diol mixture may then be converted into the preadduct together with the linear, higher molecular polyhydroxyl compounds with aromatic diisocyanates, e.g. diphenylmethane-4:4'-diisocyanate, which preadduct is then subjected to further reaction with the diamines or other chain-lengthening agents in polar solvents.

According to a further method of carrying out the process, NCO group-containing reaction products of dihydric alcohols containing tertiary nitrogen atoms and excess diisocyanates may be mixed with NCO group-containing reaction products of high molecular, substantially linear polyhydroxyl compounds and diisocyanates and this mixture reacted with chain-lengthening agents in polar solvents. Especially suitable for this purpose are aliphatic diisocyanates used in a molar ratio between about 1:1.1 and 1:2. For example, from 1 mol. of bis-oxyethylmethylamine and 2 mols. of hexane diisocyanate there is formed a low molecular adduct which has free NCO groups and contains tertiary nitrogen atoms, and this adduct may be reacted with chain-lengthening agent in polar solvent together with the usual preadduct of high molecular polyhydroxyl compounds and generally aromatic diisocyanates.

The advantage of this separate preparation of the NCO group-containing reaction products of higher molecular polyhydroxyl compounds and diisocyanates on the one hand and tertiary nitrogen-containing dialcohol and diisocyanate on the other hand lies in the formation of the usual NCO preadduct, which formation is completely unaffected by catalyst.

Due to the separate preparation of an NCO group-containing reaction product of dihydric alcohols containing tertiary amino groups and diisocyanates, it is also possible to avoid the difficulty which arises when starting materials containing amide and/or urea groups are reacted in the formation of preadduct in the presence of nitrogen-containing diols. Whereas the preadducts prepared from such starting materials in the presence of nitrogen-containing diols at the elevated reaction temperatures (above 75° C.) generally employed no longer give rise to sufficiently linear reaction products, probably on account of a branching reaction strongly catalysed by the tertiary nitrogen atoms (e.g. to biuret groups), it has been found that separately prepared preadducts of higher molecular polyhydroxyl compounds containing amide or urea groups can safely be mixed with diisocyanates or diols containing tertiary nitrogen atoms and diisocyanate, preferably aliphatic diisocyanate, at room temperature without risk of further reactions, and after the reaction with the chain-lengthening agents, this mixture very rapidly yields the desired substantially linear polyurethane elastomer.

Sufficient increase in the dyeability of the polyurethane elastomers is achieved if the content of tertiary amino groups in the elastomer substance is between about 20 and 400 milliequivalents of tertiary nitrogen per kilogram of elastomer substance (expressed in mval. of $N_{tert}$/kg. A content of about 40 to 300 mval., especially about 50 to 200 mval, of $N_{tert}$/kg. is sufficient.

The proportion by weight of the dihydric alcohols containing tertiary nitrogen atoms employed for the modification is very low and is about 0.5 to 5% of the weight of higher molecular polyhydroxyl compounds.

The structure of the preadducts may further be altered by including, in addition to the higher molecular polyhydroxyl compounds and the dihydric alcohols containing tertiary nitrogen atoms, other low molecular diols (molecular weight less than about 250), e.g. ethylene glycol, butanediol, hydroquinone - bis - hydroxylethyl ether, in the reaction with the diisocyanates (about 10 to 75% of the OH content of the higher molecular polyhydroxyl compounds).

Elastomers having improved dyeability can also be obtained by mixing elastomers without additives with elastomers which contain a sufficiently high proportion of hydroxyl compounds containing tertiary nitrogen which has a modifying effect. In this case, it is especially advantageous that the products obtained from the solutions according to the process also constitute elastomer substances and therefore do not affect the elastomers, for example by acting as a rigid "filler substance."

The solutions obtained by the process may, if desired, be further reacted, e.g. in the presence of free amine-, hydrazide- or similar end groups that are reactive to NCO groups, with di- or polyisocyanates, resulting in increase in viscosity, or with monoisocyanates or other "acylating" reaction components such as pyrocarbonic acid-diethyl ester, whereby the reactive end groups are converted into inactive end groups. Conversely, free, as yet unreacted isocyanate groups may be blocked by reaction with monofunctional compounds such as primary or secondary amines (e.g. dibutylamine) or alcohols, substituted hydrazines (e.g. N:N'-dimethyl hydrazine), hydrazides or semicarbazides if it is desired to prevent further reaction of the NCO end groups. Pigments, dyestuffs, optical brighteners, UV absorbents, special light protective agents, polyisocyanates, cross-linking agents or similar additives may be added to the elastomers (see for example Belg. Patent 636,976).

Thus for example reaction products of ethylene imine or of N-(β-aminoethyl)-ethyleneimine with hexane-1:6-diisocyanate or with the biuret triisocyanate from 3 mols. of hexane diisocyanate and 1 mol. of water are especially suitable for cross-linking as well as for light-stabilising the polyurethanes.

The elastomers are subjected to forming processes especially from their solutions Suitable polar solvents are particularly organic solvents which contain amide-, sulphoxide- or sulphone groups and which have the ability to undergo strong hydrogen bridge bonding, for example dimethylformamide, diethylformamide, dimethylacetamide, diisopropylpropionamide, formylmorpholine, hexamethylphosphoramide, tetramethyl urea, dimethylsulphoxide, tetramethylenesulphone. Other inert solvents such as chlorobenzene, dioxane, tetrahydrofuran, glycol formal or carbon tetrachloride may also be used in minor quantities.

For the production of elastomer threads, the usual processes such as wet spinning or dry spinning processes are suitable. The spinning velocities are in the region of about 100 to 800 m./min. in the dry spinning process and much lower in the wet spinning process (about 5 to 50 m./min.). Elastomer threads are produced also by cutting elastomer foils of a thickness of about 0.10 to 0.20 mm. by means of a foil cutting machine. Elastomer foils or coatings can be obtained by spraying, painting or doctoring on firm surfaces or textile fabrics, the solvents being removed by coagulation or evaporation.

The properties of the threads or foils are determined as follows:

TS=tensile strength (in g./den.) on a Wolpert instrument
ELg.=elongation (percent) (Wolpert instrument)
TS(B)=tensile strength (in g./den.) at the brake titre (converted).

The elastic properties are determined by means of the Elasto-Tensograph (Farbenfabriken Bayer Aktiengesellschaft) described in Chimia 16, 93–105 (1962). Preferably, the following properties are determined:

M300=tension in mg./den. at 300% elongation of the thread at a speed of elongation of 400%/min.
M150=tension at 150 elongation in the third release cycle after three times elongation to 300% at a speed of 400% per minute.
Tension drop 300%/30"=percent drop in tension at elongation to 300% (see above) after 30 seconds waiting at 300% elongation
Permanent - elongation=percent permanent elongation after 3 elongation-release cycles (in each case 300% maximum elongation, 400%/min. elongation speed) 30 seconds after release of the thread.

The test in the Fade-O-meter is carried out under normal test conditions.

Fastness to waste gases is tested by the action of nitrous gases or by 90 minutes action of waste gases from a Bunsen burner at 90°.

Dyeing is carried out according to the standard prescriptions given below, preferably the following being used for comparison purposes:

(a) 2% of red dyestuff according to DRP 230,594 (dyeing prescription A) or
(b) 10% of black after-chroming dyestuff according to DRP 164,655 (dyeing prescription B).

The use of these dyestuffs is not intended to denote any limitation but was carried out merely on account of their good response to any change in the dyeability of the elastomer substance.

Dyeing prescription A.—Dye components, if desired with the aid of 1–2% of commercial equalising agents, treated with 1% acetic acid (60%) at 50°, heated to boiling and kept boiling for one hour after further addition of 2% acetic acid (60%).

Dyeing prescription B.—(a) Dye components brought to the boil with 2% acetic acid (60%), dye at boiling temperature for one hour with addition of 4% formic acid (85%). (b) Well washed dye brought to the boil with 3% potassium dichromate/5% formic acid and chromed by boiling for 1–1½ hours.

The parts given in the examples are parts by weight unless otherwise indicated.

Example 1

600 parts of a mixed polyester of 1:6-hexanediol/2:2-dimethylpropanediol-1:3/adipic acid (molar ratio of the diols 65:35, OH number 66.5, acid number 1.0) are dewatered for one hour at 130°/12 mm. Hg, treated at 70° with 1.2 ml. of a 35% solution of $SO_2$ in dioxane and then subjected for 10 minutes in a vacuum of 12 mm. Hg, mixed with 12 parts of N-methyl-bis-(2-hydroxypropyl)-amine at 70° C. and treated with 166 parts of diphenylmethane-4:4'-diisocyanate and 334 parts of anhydrous chlorobenzene, heated to a temperature of 90 to 98° C. for 45 minutes and then cooled to room temperature.

430 parts of the reaction product are introduced with intensive stirring into a hot solution of 8.30 parts of carbodihydrazide in 744 parts of dimethylformamide and then treated with 22 parts of a $TiO_2$ (rutile) paste, (33.3% $TiO_2$). By adding 0.54 part of hexane-1:6-diisocyanate, the viscosity rises from 98 poises/20° to 690 poises/20°. The elastomer material contains, incorporated in its structure, about 100 mval. of tertiary N/kg. of elastomer substance.

Spinning of the elastomer threads is carried out by the dry spinning process in which the solution is spun through a dye plate of 16 apertures at 0.2 mm. diameter into a shaft heated to 250° into which at the same time a current of air heated to 300° is conducted from above. The filaments are drawn off at a rate of 100 meter per minute and wound with a rate of 100, 150 and 200 m./min. respectively on bobbins and subsequently heated for one hour at 130° C. The elastic and mechanical properties of the filaments are recorded on Table I. The filaments and foils cast from a solution of the elastomer show, in comparison to filaments and foils from segmented polyurethanes without tert.-N-diols in bound form, an improved stability against discoloration by light and ultraviolet radiation. Dyeing with red or black test-dyestuffs yield deep-red and deep-black colors being fast to rubbing and fast to washing.

Comparison example (without addition of a tert. N-diol.)—600 parts of the polyester of Example 1 are heated for 45 minutes at 90 to 98° C. with 166 parts of diphenylmethane-4,4'-diisocyanate and 334 parts of chlorobenzene. NCO— content of the cooled solution 2.28%.

400 parts of reaction product are stirred into a solution of 10.42 parts of carbodihydrazide in 750 parts of dimethylformamide and the elastomer soluiton is pigmented with 21.7 g. of a 33% $TiO_2$/dimethylformamide paste. After the addition of 0.55 part of hexane-1:6-diisocyanate, the viscosity rises from 58 poises/20° to 565 poises.

When the solution is spun by the dry spinning process according to Example 1, elastomer threads are obtained, the mechanical and elastic properties of which are given in Table 1 where the impairment in the so-called "permanent elongation" is very noticeable.

In tests for dyeing with red or black test dyes, only very weakly dyed threads are obtained.

Example 2

600 parts of the polyester from Example 1 are mixed with 18 parts of N-methyl-bis-(2-hydroxy propyl)-amine, heated for 35 minutes at 90 to 98° with 176 parts of diphenylmethane - 4:4' - diisocyanate and 340 parts of chlorobenzene and then cooled to room temperature.

537.5 parts of the solution prepared above are stirred into a hot solution of 9.67 parts of carbodihydrazide in 927 parts of dimethylformamide and the viscous elastomer solution is pigmented with 27.7 parts of a 33.3% $TiO_2$ paste. 0.75 part of hexanediisocyanate are then distributed in the elastomer solution with stirring, the viscosity rising from 150 to 700 poises/20°.

By the dry spinning process, highly elastic threads are obtained which contain about 150 mval./kg. of tertiary nitrogen groups. When dyed with acid or after-chroming dyestuffs, deep dyes of high fastness are obtained. The dye uptake capacity of the threads is higher than in the threads according to Example 1.

Example 3

430 parts of the solution of the polyester-polyisocyanate reaction product described in Example 1 are stirred in over a few minutes at room temperature into a suspension of aminocarbonate produced by throwing solid $CO_2$ into a solution of 5.53 parts of ethylene diamine in 735 parts of dimethylformamide, and pigmented with 28 parts of a 33.3% $TiO_2$(rutile)/dimethylformamide paste. By adding 0.535 part of hexane-1:6-diisocyanate, the viscosity of the elastomer solution rises from 175 to 625 poises/20° C.

The properties of the elastomer threads produced by the dry spinning process according to Example 1 are shown in Table 1.

The threads have good dyeability to anion-active dyestuffs, e.g. the red or black acid- or after-chroming test dyestuffs.

Example 4

600 parts of the polyester of Example 1 are mixed with 9.7 parts of N-methyl-diethanolamine and at 70° with 166 parts of diphenylmethane-4:4'-diisocyanate and 334 parts of chlorobenzene and heated for 40 minutes at 90 to 95° and then cooled to room temperature.

420 parts of the reaction product are introduced with stirring into a 65° hot solution of 7.67 parts of carbodihydrazide in 743 parts of dimethylformamide and the elastomer solution is pigmented with 22 parts of a 33% $TiO_2$(rutile)/dimethylformamide paste. By adding 0.29 part of hexane-1:6-diisocyanate, the viscosity of the solution rises from 300 to 860 poises/20°.

The elastomer threads obtained by the dry spinning process have good mechanical and elastic properties (Table 1) and good dyeability with anionic dyestuffs (acid dyestuffs).

Example 5

420 parts of the reaction product of polyester and polyisocyanate from Example 4 are introduced with vigorous stirring into a suspension prepared by the addition of about 20 parts of solid carbon dioxide to a solution of 5.12 parts of ethylene diamine in 735 parts of dimethylformamide.

After a few minutes, a viscous elastomer solution is formed with evolution of $CO_2$ and disappearance of the turbidity, and this elastomer solution is pigmented by the addition of 28 parts of a $TiO_2$(rutile)/dimethylformamide paste. After the addition of 0.29 part of hexane-1:6-diisocyanate, the viscosity rises to 610 poises/20° C.

The elastomer threads manifest good mechanical and elastic properties (Table 1) and can be dyed with acid dyestuffs to form deep and fast dyes.

Example 6

600 parts of the polyester of Example 1 are treated with a hot solution of 7.06 parts of N:N'-bis-(β-hydroxyethyl)-piperazine (M.P. 136°) in 324 parts of chlorobenzene and then with 151 parts of diphenylmethane-4:4'-diisocyanate, the mixture is heated for 50 minutes to 90 to 95° and then cooled to room temperature.

430 parts of the reaction product are introduced with stirring into a solution of 7.71 parts of carbodihydrazide in 743 parts of dimethylformamide and then pigmented with 22 parts of a 33% $TiO_2$(rutile)/dimethylformamide paste. The viscosity of this elastomer solution rises by the addition of 0.41 part of hexane-1:6-diisocyanate from 175 to 505 poises/20°.

The elastomer threads produced by the dry spinning process have very good mechanical and elastic properties (Table 1).

When dyed with 2% red acid dyestuff or 10% black chrome dyestuff, deep and luminous dyes of high fastness are obtained.

The melting point of the elastomer substance is 240° (preceded by softening at about 225°).

Example 7

(a) 800 parts of the polyester of Example 1 are heated at 90 to 98° for 50 minutes with 193 parts of diphenylmethane-4:4'-diisocyanate and 426 parts of chlorobenzene (NCO content of product A after cooling 1.71%).

(b) 23.8 parts of N-methyl diethanolamine and 42.0 parts of hexane-1:6-diisocyanate (molar ratio 4:5) are heated at 100° C. for one hour with 65.8 parts of anhydrous dimethylformamide (NCO content of product B 1.63%).

392 parts of product A and 19.72 parts of product B are mixed and stirred into an about 70° hot solution of 8.29 parts of carbodihydrazide in 805 parts of dimethylformamide and pigmented with 23.2 g. of a 33% $TiO_2$/dimethylformamide paste. After addition of 0.95 part of hexane-diisocyanate, the viscosity of the homogeneous elastomer solution rises from 35 poises to 350 poises. Threads produced by the conventional method in the dry spinning process have the properties shown in Table 1. The threads can be dyed to deep colors with acid dyestuffs. The content in tertiary nitrogen is about 100 mval./kg. of elastomer substance.

Example 8

16.5 parts of hexane-1:6-diisocyanate dissolved in 10 parts of glycol monomethyl ether acetate are added dropwise over 30 minutes to a solution of 24.1 parts of N-methyl diethanolamine in 50 parts of glycol monomethyl ether acetate and the solution then heated for 2 hours at 110° C. The solvent is largely removed at 65° C./12 mm. Hg, 45 parts of an oil then remaining behind.

300 parts of the polyester of Example 1 are mixed with 9 parts of the diol prepared above and 167 parts of chlorobenzene and heated for 50 minutes at 95 to 97° C. with 80.2 parts of diphenylmethane-4:4'-diisocyanate (NCO content after cooling 1.76%).

450 parts of the solution of reaction product containing NCO groups is stirred into a solution of 9.30 parts of carbodihydrazide in 789 parts of dimethylformamide and the resulting viscous solution is pigmented with 8 g. of $TiO_2$.

By addition of 1.32 parts of hexanediisocyanate, the viscosity of the solution rises from 46 to 610 poises/20°.

The properties of the threads which are obtained by cutting foils of 0.20 mm. thickness are given in Table 1.

The tertiary nitrogen content is about 100 mval./kg. of elastomer substance.

The threads can be dyed with acid dyestuffs to deep and clear tones.

TABLE I

| Example No. | Preliminary elongation (fixed at 130°/60 min.) | Titre, den. | TS, g./den. | Elongation, percent | TS (B), g./den. | M300 | M150 | Drop in tension, 300%/30'' | Permanent elongation, percent | Dyeability (acid dyestuffs) |
|---|---|---|---|---|---|---|---|---|---|---|
| 1 | 0 | 237 | 0.73 | 703 | 5.89 | 94 | 20 | 32 | 10 | Very good. |
|   | 50 | 167 | 0.89 | 556 | 5.80 | 163 | 22 | 37 | 10 | |
|   | 100 | 131 | 0.91 | 504 | 5.50 | 290 | 23 | 42 | 9 | |
| Comparison test | 0 | 213 | 0.75 | 620 | 5.36 | 140 | 20 | 39 | 16 | Poor. |
|   | 50 | 161 | 0.86 | 530 | 5.44 | 245 | 20 | 41 | 16 | |
|   | 100 | 131 | 0.95 | 430 | 5.04 | 370 | 21 | 47 | 17 | |
| 2 | 0 | 214 | 0.80 | 660 | 6.10 | 110 | 20 | 35 | 10 | Very good. |
|   | 50 | 156 | 0.87 | 580 | 5.88 | 165 | 21 | 40 | 10 | |
|   | 100 | 120 | 0.95 | 510 | 5.81 | 255 | 21 | 42 | 10 | |
| 3 | 0 | 225 | 0.73 | 685 | 5.76 | 96 | 20 | 31 | 12 | Do. |
|   | 50 | 165 | 1.02 | 522 | 6.40 | 210 | 22 | 37 | 12 | |
|   | 100 | 133 | 1.11 | 425 | 6.09 | 365 | 28 | 45 | 12 | |
| 4 | 0 | 228 | 0.77 | 660 | 5.90 | 97 | 20 | 32 | 11 | Do. |
|   | 50 | 171 |  | 520 |  | 146 | 23 | 39 | 9 | |
|   | 100 | 131 |  | 480 |  | 230 | 23 | 45 | 8 | |
| 5 | 0 | 232 | 0.79 | 660 | 6.00 | 93 | 22 | 29 | 13 | Do. |
|   | 50 | 166 | 1.01 | 510 | 6.20 | 191 | 23 | 40 | 12 | |
|   | 100 | 137 | 1.18 | 440 | 6.30 | 320 | 23 | 41 | 13 | |
| 6 | 0 | 214 | 0.85 | 705 | 6.82 | 100 | 22 | 31 | 10 | Do. |
|   | 50 | 156 | 1.00 | 620 | 7.17 | 145 | 22 | 35 | 8 | |
|   | 100 | 124 | 1.06 | 515 | 6.50 | 230 | 22 | 44 | 10 | |
| 8 | 0 | 214 | 0.68 | 630 | 4.96 | 125 | 18 |  | 12 | Do. |
|   | 50 | 154 | 0.83 | 550 | 5.44 | 175 | 18 |  | 12 | |
|   | 100 | 133 | 0.99 | 485 | 5.40 | 300 | 19 |  | 13 | |
| Threads cut from films (8) |  | 1,110 | 0.63 | 690 | 5.0 | 111 | 23 |  | 12 | Do. |

Example 9

600 parts of the polyester of Example 1 are heated for 40 minutes at 80° C. with 9,92 parts of N,N-diethyl-l',N'-bis-(β-hydroxypropyl)-propylene-diamine-1,3, 170.1 parts of diphenylmethane-4,4'-diisocyanate and 335 parts of anhydrous chlorobenzene.

400 parts of the solution prepared above are stirred into a solution of 9.64 parts of carbohydrazide in 790 parts of dimethylformamide. The viscosity of the elastomer-solution rises to 490 poises/20°. The viscous elastomer solution is pigmented with 22 parts of an 33% $TiO_2$/dimethylformamide paste.

In the dry spinning process the filaments are drawn out of the spinning cell with a speed of 100 m./min. and wound on bobbins with a speed of 100 m./min., 150 m./min. and 200 m./min. (Preelongation 0.50 or 100%). The filaments after a thermal treatment of 1 hour at 130° on the bobbins show the following properties:

| Preelongation (fixed at 130°/60 min.) | Titre, den. | TS, g./den. | Elongation, percent | TS (B), g./den. | M300, mg./den. | M150, mg./den. | Drop in tension, 300%/30'' | Permanent elongation, percent |
|---|---|---|---|---|---|---|---|---|
| 0 | 235 | 0.60 | 580 | 4.0 | 130 | 18 | 38 | 10 |
| 50 | 161 | 0.68 | 470 | 3.9 | 230 | 19 |  | 10 |
| 100 | 134 | 0.84 | 410 | 4.3 | 300 | 21 |  | 10 |

When dyed with anionic dyestuffs, dyeings with a high wet-fastness are obtained; the elastic filaments, dyed with 2% by weight of Acid Blue (Color Index 220) was treated for 10 minutes with boiling distilled water. The water shows no color.

Example 10

600 parts of the polyester of Example 1 are heated for 30 minutes at 90° C. with 27.7 parts of N,N-dimethyl-N',N'-bis-(β-hydroxyethyl)-propylene diamine-1,3; 165 parts of diphenylmethane-4,4'-diisocyanate and 392 parts of chlorbenzene.

600 parts of the solution are stirred into a hot solution (temperature 65° C.) of 8.83 parts of carbohydrazide in 626 parts of dimethylformamide. When cooled to room temperature, 26 parts of a 33.3% by weight of titanium-dioxyde/dimethyl formamide paste are added. By stirring into the solution 0.52 part of hexane-1,6-diisocyanate the viscosity rises from 143 to 625 poises/20° C. The intrisic viscosity of the solid elastomer is 1.04 (measured in a 1% solution of the elastomer in hexamethylphosphor amide at 25° C. Intrinsic viscosity $[\eta]=\ln\eta R/C$; C=concentration in g./100 ml.; $\eta R$=relative solution viscosity).

Elastic filaments produced by the conventional method in the dry spinning process have a content of tertiary nitrogen of about 250 mval. per kg. of elastomer substance. The wet-fastness of dyeings are tested with 2% of Acid red, C.I. 23 635; 2% of Acid Blue, C.I. 220 and 12% of a black dyestuff according to German Patent 164,655:

| Dyestuffs | Amount, percent | Perspiration-fastness, alkaline (according to DIN 54020/I) | Perspiration-fastness, acid (according to DIN 54020/II) |
|---|---|---|---|
| Acid red C.I. No. 23635. | 2 | 4-5 P<br>4-5 Z | 4-5 P<br>4-5 Z |
| Acid blue C.I. 220 | 2 | 4-5 P<br>4-5 Z | 4-5 P<br>4-5 Z |
| Black dye-stuff G.P. 164655. | 12 | 3 P<br>3-4 Z | 4-5 P<br>4-5 Z |

P=bleeding on polyamide; Z=bleeding on viscose.

The fastness to boiling was determined by boiling the dyed filaments 10 minutes in the distilled water and after removal of the elastomeric fibers the corresponding amount of wool is dyed with the dyestuff being eventually in the water.

Furthermore a comparison test was carried out with an elastomer containing 5% by weight of polymeric β-diethylaminoethyl-methacrylate instead of the built in N,N-dimethyl-N,N'-bis-(β-hydroxethyl)-propylene diamine-1,3.

| Filaments | m Val tert., N/kg. | Acid Blue 220, 2% | Fastness to boiling (color of the water) | Color of the wool |
|---|---|---|---|---|
| Elastomeric filaments according to Example No. 10. | 250 | No dyestuff in the dye bath. | Clear | Undyed. |
| Addition of 5% of Poly-(β-diethyl-aminoethylmeth-acrylate. | 275 | Slight dyestuff separation in the dye bath. | Strongly colored water. | Deep blue. |

Example 11

1000 parts of a polytetramethylene ether diol (hydroxyl number 56) and 42 parts of N,N-diethyl-N',N'-bis-(β-hydroxypropyl)-propylene diamine-1,3 are heated with 275 parts of diphenylmethane-4,4'-diisocyanate for 35 minutes at 75 to 85° C., the obtained melt of the NCO-prepolymer being dissolved in 1292 parts of dimethylformamide and the solution cooled to room temperature.

1000 parts of the solution (NCO-content 1.31%) are stirred into a hot solution (60° C.) of 14.8 parts of carbohydrazide and 0.3 part of asymmetrical dimethylhydrazine in 1572 parts of dimethylformamide. Elastomer filaments being formed by spinning the solution in a water-bath (40° C.) containing 25% of dimethyl formamide and subsequently washing in hot water bath (95° C.).

The dyeing with acid dyes yields filaments having a high wet-fastness.

What we claim is:

1. An elastic filament having an essentially linear structure of a segmented polyurethane formed by reaction of a linear dihydroxyl compound having terminal hydroxyl groups with an excess of an organic diisocyanate and with a chain-extending agent consisting of a diamine, hydrazne and a dihydrazide and mxtures thereof, said segmented polyurethane containing units of the formula connected through amide groups in the segmented polyurethane

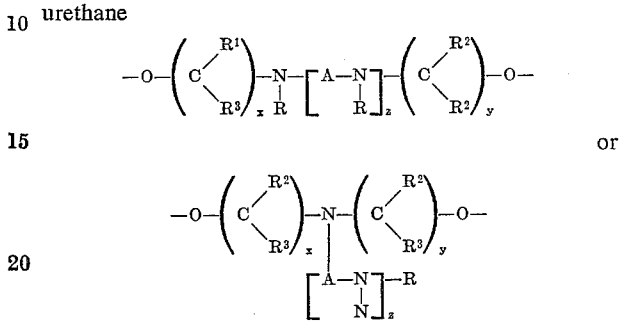

or wherein A is an alkylene chain, R is lower alkyl, cycloaliphatic or araliphatic, $R^2$ is hydrogen or lower alkyl, $R^3$ a member of the group consisting of hydrogen and an alkyl, $x$ and $y$ an integer from 1 to 6 and $z$ is a whole number from 0 to 2; said units having at least one tertiary nitrogen atom and being present in such an amount that 20 to 400 mval. of tertiary nitrogen are included per kg. of elastomer substance.

2. The elastic filament of claim 1, in which said linear dihydroxyl compound is a polyester of an aliphatic diol and adipic acid, having a melting point of below 60° C. and a molecular weight of 800 to 3000.

3. The elastic filament of claim 2, in which said aliphatic diol is a polytetramethylene ether diol, having a molecular weight of 800 to 3000.

4. The elastic filament of claim 1, in which said diisocyanate is a symmetrical aromatic diisocyanate.

5. The elastic filament of claim 4 in which said symmetrical aromatic diisocyanate is diphenylmethane-4,4'-diisocyanate.

6. The elastic filament of claim 1, in which said chain-extending agent is carbodihydrazide.

7. The elastic filament of claim 1, in which said chain-extending agent is ethylene diamine.

8. The process for preparing elastic filaments from a solution of a substantially linear polyurethane elastomer in an organic polar solvent containing amide, sulfoxide or sulfone groups which consists of reacting at a temperature of from about 40° C. to about 120° C., a substantially linear dihydroxyl compound having a molecular weight of about 500 to about 5000 with an excess of an organic diisocyanate and with a chain-extending agent selected from the group consisting of hydrazine, a dihydrazide and a diamine, said reaction being carried out in the presence of from about 0.5 to about 5 percent by weight based on the weight of said substantially linear dihydroxyl compound of a dihydric alcohol having the formula:

$$HO-(CR^2R^3)_x-N-\begin{bmatrix}R\\|\\A-N\end{bmatrix}_x-R_4$$

wherein A is an alkylene group, R is lower alkyl, cycloaliphatic, $R^1$ is lower alkyl, $R^2$ is hydrogen, or lower alkyl, $R^3$ is a member of the group consisting of hydrogen and an alkyl group, $R^4$ is hydroxyalkyl or

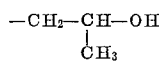

$x$ and $y$ an integer from 1 to 6 and $z$ an integer from 0 to 2, the amount of the dihydric alcohol being in such a range that a content of 20 to 400 mval. of tertiary nitrogen are present per kg. of polyurethane elastomer and spinning said solution into filaments.

9. The process of claim 8, in which said dihydric alcohol is N-methyl-bis-(2-hydroxylpropyl)-amine.

10. The process of claim 8, in which said dihydric alcohol is N,N-diethyl-N',N'-bis-(β-hydroxypropyl)-propylene diamine-1,3.

References Cited

UNITED STATES PATENTS

| | | | |
|---|---|---|---|
| 3,040,003 | 6/1962 | Beaman | 260—77.5 |
| 3,136,830 | 6/1964 | Oertel et al. | 264—184 |
| 3,180,853 | 4/1965 | Peters | 260—77.5 |
| 3,200,155 | 8/1965 | Kirkpatrick et al. | 260—584 |
| 3,305,533 | 2/1967 | Thoma et al. | 260—75 |

DONALD E. CZAJA, Primary Examiner

H. S. COCKERAM, Assistant Examiner

U.S. Cl. X.R.

260—77

PO-1050
(5/69)

UNITED STATES PATENT OFFICE
CERTIFICATE OF CORRECTION

Patent No. 3,461,102        Dated August 12, 1969

Inventor(s) Harald Oertel, et al.

It is certified that error appears in the above-identified patent and that said Letters Patent are hereby corrected as shown below:

Column 1, line 33, "liear" should read --- linear ---.

Column 3, line 38, the words "gen atom and aliphatic carbon atoms are given below" should be deleted.

Column 4, line 41, that portion of the formula "CH:OH" should be --- CH.OH ---.

Column 5, line 69, "lenegthening" should be --- lengthening ---.

Column 13, line 32, the second line of the tabular column "Perspiration fastness acid" should read --- 4-5 Z ---.

Column 14, line 7, "hydrazne" should be --- hydrazine --- and "mxtures" should be --- mixtures ---.

Column 14, line 12, the portion of the formula reading " 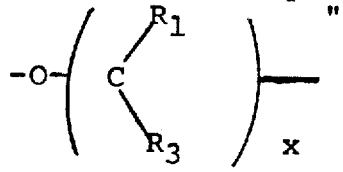 "

should be --- 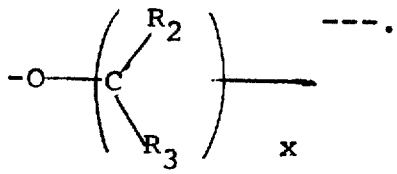 ---.

SIGNED AND
SEALED
APR 28 1970

(SEAL)
Attest:

Edward M. Fletcher, Jr.
Attesting Officer

WILLIAM E. SCHUYLER, JR.
Commissioner of Patents